United States Patent
Sands et al.

(10) Patent No.: US 7,874,286 B2
(45) Date of Patent: Jan. 25, 2011

(54) HEATED HOLDING COMPARTMENT FOR FOOD

(75) Inventors: Jeffrey L. Sands, Freeport, IL (US);
Ronald J. Glavan, Rockton, IL (US);
Curtis J. Scadden, Madison, WI (US);
Ronald J. Dorsten, Oak Park, IL (US);
Arthur J. Erickson, Aurora, IL (US);
Craig M. Conley, Oswego, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 933 days.

(21) Appl. No.: 11/103,364

(22) Filed: Apr. 11, 2005

(65) Prior Publication Data

US 2005/0229919 A1 Oct. 20, 2005

Related U.S. Application Data

(60) Provisional application No. 60/563,129, filed on Apr. 16, 2004.

(51) Int. Cl.
*A21B 1/22* (2006.01)
*A21B 1/48* (2006.01)

(52) U.S. Cl. .................. 126/41 C; 126/21 A; 126/21 R; 99/339; 99/443 C; 99/386; 198/432; 198/443; 198/606; 198/457.03

(58) Field of Classification Search ............... 99/443 R, 99/443 C, 386, 467, 483; 126/41 C, 21 A; 198/406, 461.02, 461.01, 456
See application file for complete search history.

(56) References Cited

U.S. PATENT DOCUMENTS

| | | | | |
|---|---|---|---|---|
| 3,961,569 A | * | 6/1976 | Kenyon et al. ................. 99/451 |
| 4,023,476 A | * | 5/1977 | Burgess, Jr. ................... 99/468 |
| 4,179,985 A | | 12/1979 | Baker et al. |
| 4,431,104 A | * | 2/1984 | Orlowski et al. ............. 198/427 |
| 5,496,000 A | * | 3/1996 | Mueller .................... 244/118.1 |
| 5,564,594 A | * | 10/1996 | Monfredo ............... 221/150 A |
| 5,727,654 A | * | 3/1998 | Roessner et al. .............. 186/40 |
| 6,192,877 B1 | | 2/2001 | Moshonas et al. |
| 6,250,296 B1 | | 6/2001 | Norris et al. |
| 6,369,360 B1 | * | 4/2002 | Cook .......................... 219/388 |
| 6,539,934 B2 | | 4/2003 | Moshonas et al. |
| 7,104,388 B2 | * | 9/2006 | Walker ........................ 198/433 |
| 7,297,903 B1 | * | 11/2007 | March et al. ................. 219/388 |
| 2003/0213372 A1 | * | 11/2003 | Lappat et al. .................. 99/330 |
| 2004/0016744 A1 | * | 1/2004 | Ottaway ..................... 219/391 |

OTHER PUBLICATIONS

International Search Report dated Nov. 21, 2006.

* cited by examiner

*Primary Examiner*—Steven B McAllister
*Assistant Examiner*—Nikhil Mashruwala
(74) *Attorney, Agent, or Firm*—Ryndak & Suri LLP

(57) ABSTRACT

A food item is cooked in a cooking device and transferred to a heated holding table by two exit conveyors. The food item then falls onto one of two transfer conveyors that move perpendicularly to the direction of movement of the exit conveyors. The food items travel on the transfer conveyors and then fall onto a main conveyor. The main conveyor moves in a direction that is parallel to the direction of movement of the exit conveyors. If the food item has not been manually removed from the main conveyor after a predetermined amount of time, the food item falls off the main conveyor and into a drawer waste chute for disposal.

34 Claims, 2 Drawing Sheets

HEATED HOLDING COMPARTMENT FOR FOOD

REFERENCE TO RELATED APPLICATIONS

This patent application claims priority to U.S. Provisional Application No. 60/563,129 filed on Apr. 16, 2004.

BACKGROUND OF THE INVENTION

The present invention relates generally to a heated holding table including a conveyor belt that moves food from a cooking device to a preparation area.

Food, such as a hamburger, is commonly cooked in a cooking device, such as a grill. Some cooking devices employ a heated conveyor belt that cooks the food as it travels over a heater. The cooked food generally falls off an end of the conveyor belt of the cooking device and lands on a holding table. The food is manually removed from the holding table and then moved to a preparation area for preparation.

A drawback to prior holding tables is that the cooked food must be manually moved from the holding table to the preparation area. The food can be accidentally dropped when moved from the holding table to the preparation area, and it would then have to be thrown away. Another drawback is that the holding table does not have a temperature and humidity controlled environment, and the food on the holding table can get cold or can dry out.

Hence, there is a need in the art for a heated holding table that moves food from a cooking device to a preparation area that overcomes the drawbacks and shortcomings of the prior art.

SUMMARY OF THE INVENTION

A heated holding table is located proximate to a cooking device. The cooking device cooks a food item, and the food item exits the cooking device along one of two exit conveyors. When the food reaches the end of the exit conveyors, the food falls off the exit conveyor and lands on one of two transfer conveyors. The transfer conveyors move in a direction that is substantially perpendicular to the direction of movement of the exit conveyors.

When the food reaches the end of the transfer conveyor, the food falls off the transfer conveyor and lands on a main conveyor. The main conveyor moves in a direction that is substantially parallel to direction of movement of the exit conveyors. Ultraviolet lights located over the main conveyor help to heat the food items on the main conveyor.

The main conveyor moves at a speed that is less than the speed of the other conveyors. If the food item is not manually removed from the main conveyor after a predetermined amount of time, the food item reaches the end of the main conveyor and falls into a waste chute for disposal.

The heated holding table also includes a humidity regulator and a temperature regulator that regulate the humidity and temperature, respectively, of the food items in the heated holding table to maintain the quality of the food item.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
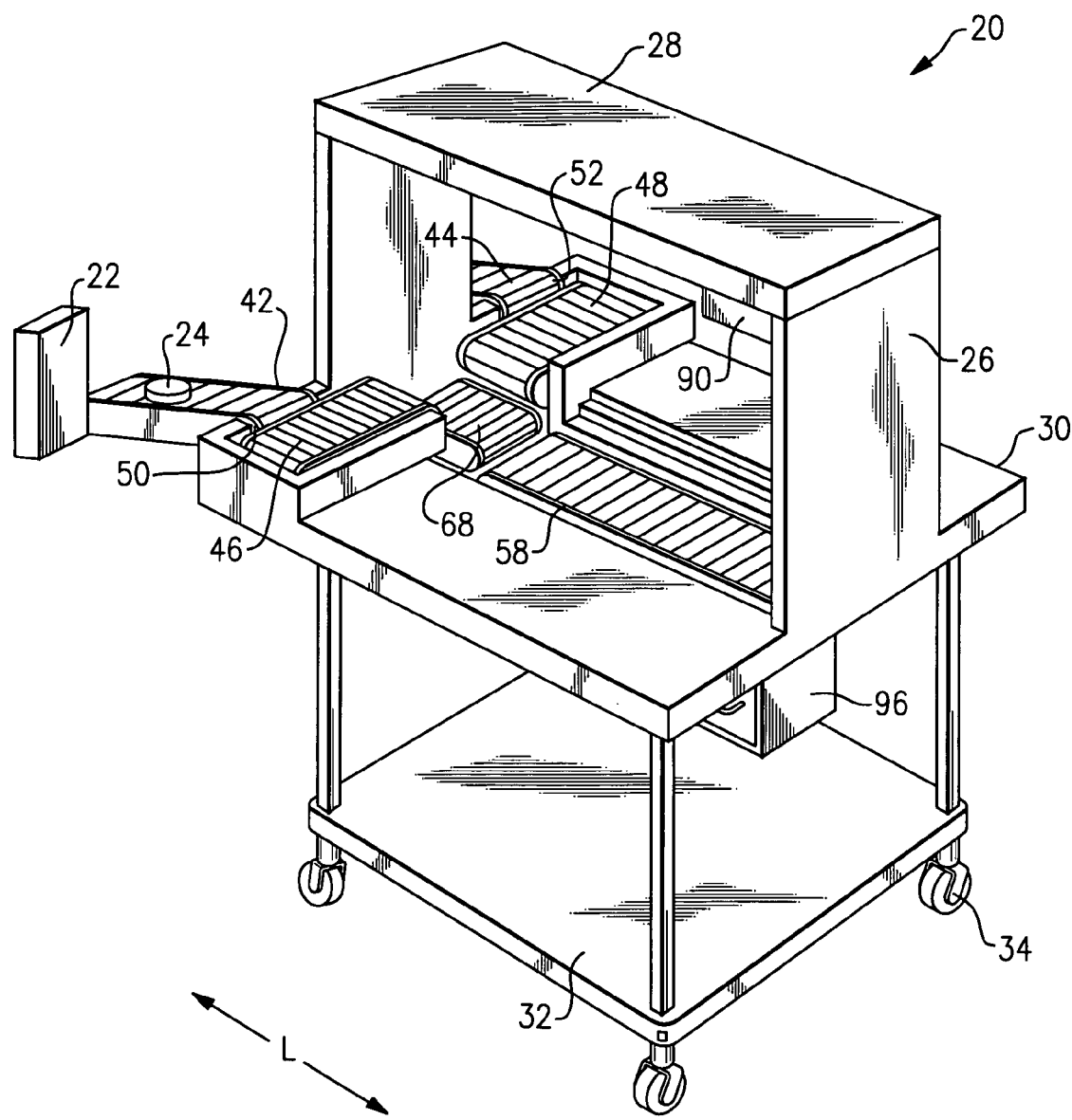
FIG. 1 schematically illustrates a perspective view of a heated holding table of the present invention including the conveyors.

FIG. 1 schematically illustrates a heated holding table 20 of the present invention. The heated holding table 20 is located proximate to a cooking device 22, such as a grill. A food item 24, such as a hamburger patty, is cooked in the cooking device 22. The food item 24 exits the cooking device 22 and enters the heated holding table 20. In one example, the cooking device 22 is a vertical grill as described in U.S. patent application Ser. No. 10/124,629 filed Apr. 17, 2002, U.S. Pat. No. 6,717,111 issued Apr. 6, 2004, and U.S. patent application Ser. No. 10/726,017 filed Dec. 2, 2003.

The heated holding table 20 includes a body portion 26 having an upper shelf 28, a preparation area 30, a lower shelf 32, and a length L. In one example, the body portion 26 is made of stainless steel. Wheels 34 attached to the body portion 26 allow the heated holding table 20 to be moveable. In one example, the preparation area 30 is heated by a heater (not shown).

Figure 2:
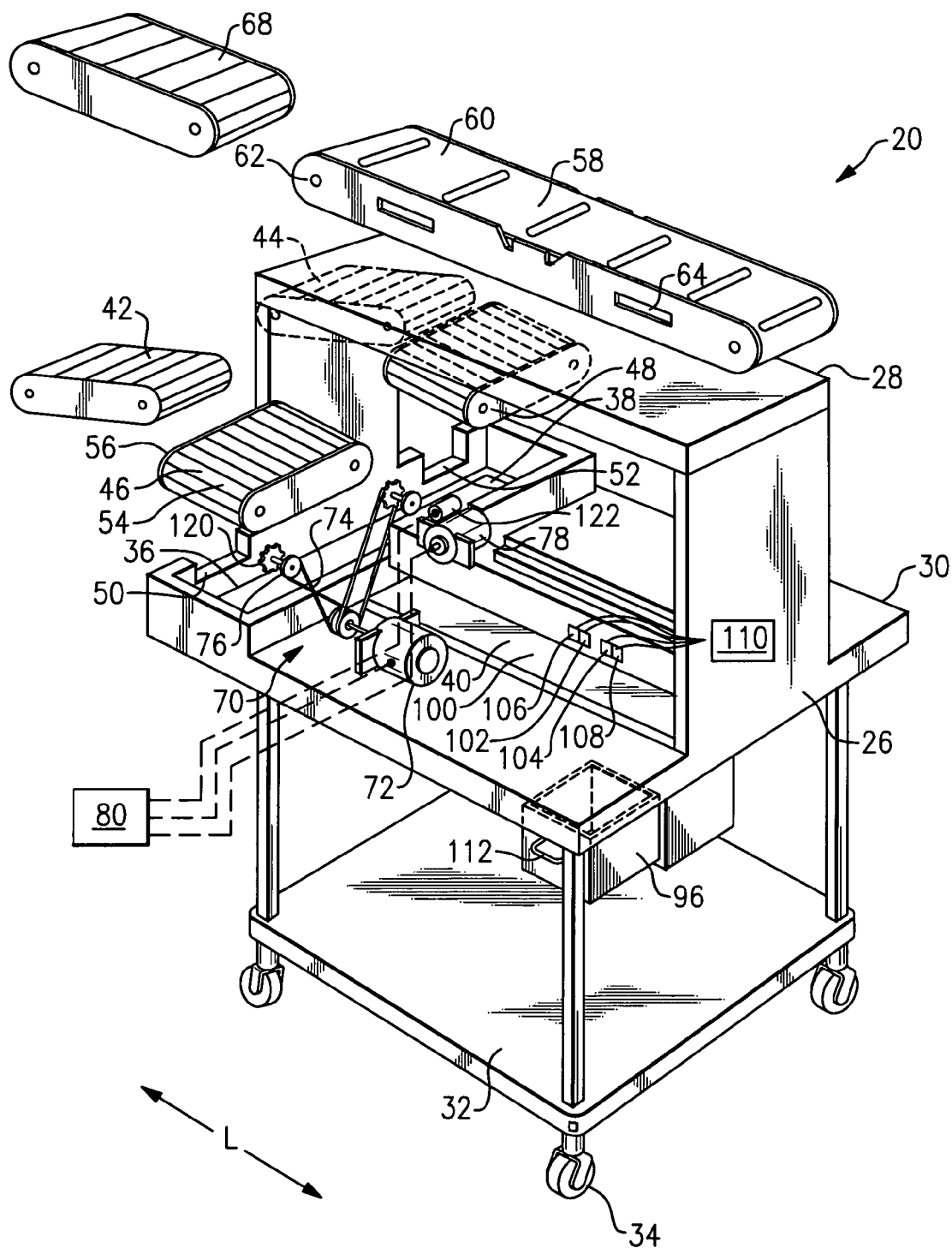
FIG. 2 schematically illustrates a perspective view of the heated holding table of the present invention including a drive mechanism.

As shown in FIG. 2, the body portion 26 includes a first transfer table 36, a second transfer table 38, and a main conveyor table 40. An external heater (not shown) heats the main conveyor table 40. In one example, the external heater is a mica type heater located under a stainless steel sheet 100. The stainless steel sheet 100 defines the bottom of the main conveyor table 40.

Returning to FIG. 1, the cooking device 22 includes a first exit conveyor 42 and a second exit conveyor 44. Each exit conveyor 42 and 44 is received in a respective opening 50 and 52 in the heated holding table 20. The exit conveyors 42 and 44 are moveable in a direction substantially parallel to the length L of the body portion 26. After cooking, the food item 24 lands on and travels along one of the exit conveyors 42 and 44. Preferably, the exit conveyors 42 and 44 are slightly inclined such that the food item 24 travels upwardly when traveling from the cooking device 22 to the heated holding table 20. However, the exit conveyors 42 and 44 can also be slightly declined or horizontal. When the food item 24 reaches the end of the exit conveyors 42 and 44, the food item 24 falls onto transfer conveyors 46 and 48, respectively.

The transfer conveyors 46 and 48 are each received in the first transfer table 36 and second transfer table 38, respectively. The transfer conveyors 46 and 48 move in a direction substantially perpendicular to the length L of the body portion 26. That is, the transfer conveyors 46 and 48 move in a direction that is substantially perpendicular to the direction of movement of the exit conveyors 42 and 44. The transfer conveyor 46 moves in a direction that is opposite to the direction of movement of the transfer conveyor 48. Each transfer conveyor 46 and 48 includes a conveyor belt 54 moveable about a frame 56. In one example, the frame 56 is made of plastic. However, the frame 56 can be made of any material, and one skilled in the art would know what materials to employ. When a food item 24 reaches the end of the transfer conveyors 46 and 48, it falls onto a small conveyor 68. Therefore, part of the small conveyor 68 is located under each of the transfer conveyors 46 and 48.

The small conveyor 68 moves in a direction that is substantially parallel to the length L of the body portion 26. That is, the small conveyor 68 moves in a direction that is substantially perpendicular to the direction of movement of the transfer conveyors 46 and 48 and substantially parallel to the direction of the movement of the exit conveyors 42 and 44. The food items 24 then fall off the small conveyor 68 and land onto a main conveyor 58 received in the main conveyor table 40. Therefore, part of the main conveyor 58 is located under the small conveyor 68. The food items 24 slightly stack as they fall onto the main conveyor 58.

The main conveyor 58 moves in a direction substantially parallel to the length L of the body portion 26. That is, the small conveyor 68 and the main conveyor 58 move in the same direction. The main conveyor 58 includes a conveyor belt 60 moveable about the frame 62. In one example, the conveyor belt 60 is made of plastic. An operator can remove the main conveyor 58 from the main conveyor table 40 for cleaning. The main conveyor 58 includes handles 64 that facilitate removal of the main conveyor 58 from the heated holding table 20. When installed in the body portion 26, the main conveyor 58 is positioned above the stainless steel sheet 100. The heater under the stainless steel sheet 100 heats the conveyor belt 60 and the food items 24 on the main conveyor 58. Ultraviolet lights 90 located over the main conveyor table 40 also keep the food items 24 on the main conveyor 58 warm.

A drive mechanism 70 drives the conveyors 46, 48, 58 and 68. A drive motor 72 drives a belt 74 wrapped around drive gears 76 having teeth 120. The teeth 120 engage the transfer conveyors 46 and 48 to drive the transfer conveyors 46 and 48. A drive motor 78 and 122 drives the main conveyor 58 and the small conveyor 68, respectively, using a similar mechanism. A controller 80 provides a signal to the drive motors 72, 78 and 122 to move the transfer conveyors 46 and 48, the main conveyor 58 and the small conveyor 68 at a predetermined speed. Preferably, the conveyors 46, 48, and 68 all move at the same speed, and the main conveyor 58 moves at a speed that is less than the speed of the conveyors 46, 48 and 68. The speed of the main conveyor 58 can be set by the customer based on the desired holding time of the food items 24 in the heated holding table 20.

In other embodiments, heated sliding glass panels cover the main conveyor 58. A pivotal cover can also cover the transfer conveyors 46 and 48, the small conveyor 68 and the area where the food items 24 drop from the exit conveyors 42 and 44 onto the transfer conveyors 46 and 48. Preferably, the cover is made of glass and is clear to provide visibility to the transfer conveyors 46 and 48 and the food items 24. Alternately, the heating holding table 20 does not include the small conveyor 68.

The heated holding table 20 can also include a humidity sensor 102 and a temperature sensor 104 that detect the humidity and temperature, respectively, in the heated holding table 20 to maintain the quality of the food item 24. If the humidity sensor 102 or temperature sensor 104 detect the humidity or the temperature in main conveyor table 40 is not at an optimal value, a humidity regulator 106 and a temperature regulator 108 adjust the temperature and humidity in the heated holding table 20. In one example, the humidity regulator 106 produces steam. A control 110 regulates the humidity regulator 106 and the temperature regulator 108 based on the values detected by the humidity sensor 102 and the temperature sensor 104.

Over time, the main conveyor 58 moves the food items 24 away from the cooking device 22. After a predetermined amount of time, if the food item 24 has not been manually removed from the main conveyor 58, the food item 24 reaches the end of the main conveyor 58 and falls into a drawer waste chute 96. The drawer waste chute 96 is slidable to an open position to allow for removal of the food item 24 from the heated holding table 20. The drawer waste chute 96 includes a handle 112 that can be pulled by an operator to pull the drawer waste chute 96 into the open position.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A holding table for moving an item away from a cooking device comprising:
   a body portion defining a compartment;
   a main endless member located within the compartment and moveable relative to the body portion to move the item away from the cooking device, wherein the main endless member is moveable in a first direction;
   a heater to heat the main endless member;
   a first transfer endless member moveable in a second direction substantially horizontally perpendicular to the first direction and positioned to move an item in a direction towards the main endless member and from outside of and into the compartment; and
   a tabletop comprising a generally planar food preparation area adjacent the main endless member, wherein the tabletop extends along the main endless member.

2. The holding table as recited in claim 1 further comprising an exit endless member moveable in the first direction, for transferring the item from the cooking device to the first transfer endless member.

3. The holding table as recited in claim 1 further comprising a speed control, wherein the first transfer endless member moves at a transfer speed and the main endless member moves at a main speed that is less than the transfer speed, and the main speed and the transfer speed are controlled by the speed control.

4. The holding table as recited in claim 1 further comprising a first exit endless member moveable in the first direction, and the first exit endless member is capable of transferring items from the cooking device to the first transfer endless member.

5. The holding table as recited in claim 1 further comprising a light source located over the main endless member.

6. The holding table as recited in claim 1 wherein the body portion is made of stainless steel.

7. The holding table as recited in claim 1 further comprising a temperature sensor to sense a temperature in the body portion and a temperature regulator control to adjust the temperature in the body portion to an optimal temperature.

8. The holding table as recited in claim 1 further comprising a pressure humidity sensor to sense a pressure humidity in the body portion and a pressure humidity regulator to adjust the pressure humidity in the body portion.

9. The holding table as recited in claim 1 wherein the main endless member is a conveyor belt.

10. The holding table as recited in claim 1 wherein the heater is located below the main endless member.

11. The holding table as recited in claim 1 further comprising a waste chute, and the item falls into the waste chute from the main endless member for disposal.

12. The holding table as recited in claim 11 wherein the item falls into the waste chute if not removed from the main endless member after a predetermined amount of time.

13. The holding table as recited in claim 1 wherein the main endless member is plastic.

14. The holding table as recited in claim 1 wherein the item is food.

15. A holding table for moving an item from a cooking device comprising:
   a body portion;
   a main endless member moveable in a first direction;
   a first transfer endless member moveable in a second direction substantially perpendicular to the first direction;
   a second transfer endless member moveable in a third direction substantially perpendicular to the first direction and substantially parallel to the second direction, wherein the first transfer endless member and the second transfer endless member transfers the item from the cooking device to the main endless member;
   a heater to heat the main endless member; and
   a speed control, wherein the first transfer endless member and the second transfer endless member both move at a common speed and the main endless member moves at a main speed that is less than the common speed, and the main speed and the common speed are controlled by the speed control.

16. The holding table as recited in claim 15 further comprising a light source located above the main endless member.

17. The holding table as recited in claim 15 further comprising a first exit endless member and a second exit endless member both moveable in the first direction, wherein the first endless member and the second endless member are capable of transferring items from the cooking device to the first transfer endless member and the second transfer endless member, respectively.

18. A holding table for moving an item away from a cooking device comprising:
   a body portion;
   a main endless member received in the body portion and moveable relative to the body portion to move the item away from the cooking device, wherein the main endless member is moveable in a first direction;
   a heater to heat the item on the main endless member; and
   a speed control for setting a desired holding time for the food items, the speed control controlling the speed of the main endless member, wherein the item falls off the main endless member after the desired holding time, if the item is not removed from the main endless member before the expiration of the desired holding time;
   wherein the item on the main endless member is accessible during operation of the holding table at a plurality of locations permitting removal of the item from the main endless member before the expiration of the desired holding time; and
   a transfer endless member moveable in a second direction for transferring the item to the main endless member.

19. The holding table of claim 18 wherein the body portion includes a transparent cover or a transparent sliding panel for permitting removal of the item from the main endless member.

20. The holding table of claim 19 further comprising a humidity sensor to sense humidity in the body portion and a controller connected to the humidity sensor.

21. The holding table of claim 20 further comprising a humidity regulator connected to the controller, the humidity regulator to increase the humidity in the body portion.

22. The holding table of claim 21 wherein the humidity regulator adjusts the humidity in the body portion with steam.

23. The holding table of claim 18 wherein the body portion has an open side for permitting removal of the item from the main endless member.

24. The holding table of claim 18 wherein the heater to heat the item comprises a light for heating the food.

25. The holding table of claim 18 wherein the transfer member moves at a speed faster than the speed of the main endless member.

26. The holding table of claim 18 wherein the speed control controls the speed of the transfer member.

27. The holding table as recited in claim 18 further comprising an exit endless member, wherein the exit endless member is capable of transferring items from the cooking device to the transfer endless member.

28. A holding table for moving an item away from a cooking device comprising:
   a body portion;
   a main endless member received in the body portion and moveable relative to the body portion to move the item away from the cooking device, wherein the main endless member is moveable in a first direction;
   a heater to heat the main endless member;
   a waste chute for disposal, the item falling into the waste chute from the main endless member for disposal if not removed from the main endless member after a predetermined amount of time; and
   a transfer endless member moveable in a second direction substantially perpendicular to the first direction, wherein the transfer endless member transfers the item from the cooking device to the main endless member.

29. The holding table as recited in claim 28 further comprising an exit endless member moveable in the first direction, wherein the exit endless member transfers the item from the cooking device to the transfer endless member.

30. A holding table for moving an item away from a cooking device comprising:
   a body portion;
   a main endless member received in the body portion and moveable relative to the body portion to move the item away from the cooking device, wherein the main endless member is moveable in a first direction;
   a heater to heat the main endless member;
   a first transfer endless member moveable in a second direction substantially perpendicular to the first direction, and
   a second transfer endless member moveable in a third direction substantially perpendicular to the first direction and substantially parallel to the second direction, wherein the first transfer endless member and the second transfer endless member transfer the item from the cooking device to the main endless member.

31. A holding table for moving an item away from a cooking device comprising:
   a body portion defining a compartment, wherein the body portion is made of stainless steel;
   a main endless member located within the compartment and moveable relative to the body portion to move the item away from the cooking device, wherein the main endless member is moveable in a first direction;
   a heater to heat the main endless member; and
   a first transfer endless member moveable in a second direction substantially horizontally perpendicular to the first direction and positioned to move an item in a direction towards the main endless member and from outside of and into the compartment.

32. A holding table for moving an item away from a cooking device comprising:
   a body portion defining a compartment;
   a main endless member located within the compartment and moveable relative to the body portion to move the item away from the cooking device, wherein the main endless member is moveable in a first direction;
   a heater to heat the main endless member; and
   a first transfer endless member moveable in a second direction substantially horizontally perpendicular to the first direction and positioned to move an item in a direction towards the main endless member and from outside of and into the compartment,
   further comprising a waste chute, and the item falls into the waste chute from the main endless member for disposal.

33. The holding table as recited in claim 32 wherein the item falls into the waste chute if not removed from the main endless member after a predetermined amount of time.

34. A holding table for moving an item away from a cooking device comprising:
   a body portion defining a compartment wherein the body portion is made of stainless steel;
   a main endless member located within the compartment and moveable relative to the body portion to move the item away from the cooking device, wherein the main endless member is moveable in a first direction;
   a heater to heat the main endless member;
   a first transfer endless member moveable in a second direction substantially horizontally perpendicular to the first direction and positioned to move an item in a direction towards the main endless member and from outside of and into the compartment; and
   a generally planar food preparation area adjacent the main endless member.

* * * * *